United States Patent [19]
Gillette et al.

[11] Patent Number: 5,384,159
[45] Date of Patent: Jan. 24, 1995

[54] PROCESS FOR RESTORING DISCHARDED SILICONE-POLYCARBONATE PARTS

[75] Inventors: Gregory R. Gillette, Clifton Park; Karen K. Webb, Ballston Lake, both of N.Y.

[73] Assignee: General Electric Company, Schenectady, N.Y.

[21] Appl. No.: 124,884

[22] Filed: Sep. 22, 1993

[51] Int. Cl.6 .............................................. B32D 35/00
[52] U.S. Cl. ..................................... 427/140; 156/94; 264/36; 427/340; 427/341; 427/354; 427/387; 427/393.5; 427/412.1
[58] Field of Search ............... 427/140, 270, 271, 273, 427/340, 341, 354, 387, 393.5, 412.1; 428/412, 447; 528/488, 489; 156/94; 264/36

[56] References Cited

U.S. PATENT DOCUMENTS

| | | | |
|---|---|---|---|
| 4,242,381 | 12/1980 | Goossens et al. | 422/387 |
| 4,284,685 | 8/1981 | Olson et al. | 428/331 |
| 4,401,718 | 8/1983 | Medford | 427/140 X |
| 5,041,313 | 8/1991 | Patel | 427/379 |

*Primary Examiner*—Michael Lusignan
*Attorney, Agent, or Firm*—William A. Teoli; William H. Pittmann

[57] ABSTRACT

A process is provided for reclaiming rejected polycarbonate articles, such as an automotive headlamp-lens having a thermoplastic acrylic primer and a defective silicone hardcoat. The silicone hardcoat can be selectively removed with an aqueous alkaline bath treatment. The treated polycarbonate article can be recovered with the thermoplastic acrylic primer remaining substantially intact; the article can be restored by treatment with a silicone hardcoat.

6 Claims, No Drawings

PROCESS FOR RESTORING DISCHARDED SILICONE-POLYCARBONATE PARTS

BACKGROUND OF THE INVENTION

The present invention relates to a method for restoring silicone-polycarbonate parts which have been rejected during the manufacture of such articles. More particularly, the present invention relates to the use of an aqueous alkaline bath to treat a silicone-polycarbonate part comprising a silicone hardcoat layer, an intermediate thermoplastic acrylic primer layer and a polycarbonate substrate to effect the selective removal of a defective silicone hardcoat layer.

During the manufacture of polycarbonate parts having a silicone hardcoat and an intermediate thermoplastic acrylic primer layer, several parts are often rejected due to a defective silicone hardcoat. A typical coating procedure used to make silicone hardcoat polycarbonate articles is shown by Goossens et al., U.S. Pat. No. 4,242,381, Olson et al., U.S. Pat. No. 4,284,685 and Patel, U.S. Pat. No. 5,041,313 which are incorporated herein by reference.

A procedure for salvaging organic thermoplastic values from discarded thermoplastic articles having a decorative or protective coating is shown in copending application of Gillette et al., Ser. No. 07/981,668, filed Sep. 25, 1992. Among the articles which can be treated are silicone-polycarbonate composites which can be in granulated form. During the treatment of the composites, the silicone hardcoat is removed; if these composites have an acrylic primer, it also is removed. The resulting thermoplastic polycarbonate can then be reextruded and remolded. The remolded polycarbonate then has to be reprimed and hardcoated.

It would be desirable therefore to provide a satisfactory procedure for salvaging defective silicone-polycarbonate composites, such as intact headlamp-lenses having both a thermoplastic acrylic primer and a silicone hardcoat. It also would be desirable to avoid the requirement of having to remold such rejected parts, or the need to reprime such polycarbonate substrates after the silicone hardcoat has been removed.

SUMMARY OF THE INVENTION

The present invention is based on the discovery that if a silicone-polycarbonate part comprising a silicone hardcoat layer, an intermediate thermoplastic acrylic primer layer and a polycarbonate substrate is immersed and agitated in an aqueous alkaline solution, as defined hereinafter, for a particular duration, the silicone hardcoat can be selectively removed without substantially affecting the thermoplastic acrylic primer layer. Accordingly, substantial restoration of the original silicone-polycarbonate part can be achieved by reapplying a silicone hardcoat layer. The expression "thermoplastic acrylic primer" means acrylic material substantially free of reactive functional groups which can cross-link during a thermal cure, as distinguished from a thermosetting acrylic primer as shown, for example, by Olson et al, U.S. Pat. No. 4,284,685.

STATEMENT OF THE INVENTION

There is provided by the present invention, a process for selectively removing a defective silicone hardcoat layer from a silicone-polycarbonate composite comprising a silicone hard coat layer, an intermediate thermoplastic acrylic primer layer and a polycarbonate substrate which process comprises:

(1) effecting contact at a temperature of about 40° C. to about 100° C. between a silicone-polycarbonate composite and an aqueous alkaline bath having a pH in the range of at least 12 and up to about 14, while the bath is agitated for a time sufficient to effect the selective removal of the silicone hard coat layer from the silicone-polycarbonate composite, (2) washing and thereafter drying the resulting polycarbonate composite of (1) and (3) treating the polycarbonate composite of (2) with a silicone hardcoat mixture to form a silicone-polycarbonate composite.

Discarded silicone-polycarbonate substrates which can be surface treated in accordance with the method of the present invention include silicone hardcoat composites, shown by Schroeter et al U.S. Pat. No. 4,284,685 and Patel, U.S. Pat. No. 5,041,313 incorporated herein by reference. For example, a polycarbonate substrate can be initially primed with a thermoplastic acrylic primer followed by treatment with a silicone hardcoat composition, having a pH in the range of about 3.5 to about 8. A typical composition is shown by Clark, U.S. Pat. No. 4,027,073 incorporated herein by reference. Another variation of a colloidal silica filled silicone composition is shown by Anthony, U.S. Pat. No. 4,624,870 incorporated herein by reference.

Polycarbonate articles which can be salvaged in accordance with the practice of the present invention include materials formed from the phosgenation or transesterification of aromatic bisphenols, such as 2,2-bis-(2-hydroxyphenyl)propane, 2,4'-dihydroxybiphenylmethane, bis-(2-hydroxyphenyl)methane, 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenyl sulfone, 2,4'-dihydroxydiphenyl sulfone, 4,4'-dihydroxydiphenyl sulfoxide, 4,4'-dihydroxydiphenyl sulfide, tetramethylbisphenol A, 1,1-dichloro-2,2-bis(4-hydroxyphenyl)ethylene, 6,6'-dihydroxy-3,3,3',3'-tetramethylbis(1,1-spiroindane) (spirobiindane bisphenol),

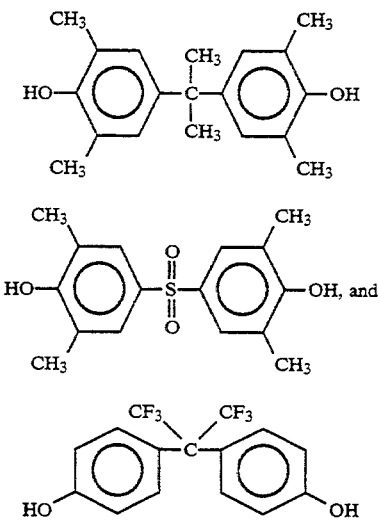

Copolycarbonates containing the above bisphenols as the major bisphenol constituents are also included.

Among the thermoplastic acrylic primers which can be used in the surface treatment of polycarbonates to impart improved surface properties thereto are thermoplastic acrylates which are shown in the Encyclopedia of Polymer Science & Technology, Vol. 1, Interscience Publishers, John Wiley & Sons, Inc. (1964), page 246. For example, acrylic acid ester monomers can be used such as, methyl acrylate, ethylmethyl acrylate, isopropyl acrylate, n-propyl acrylate, n-butyl acrylate, isobutyl acrylate, secbutyl acrylate, 2-ethylhexyl acrylate, etc. Exemplary methacrylic acid ester monomers are for example, methyl methacrylate, ethyl methacrylate, n-butyl methacrylate, isobutyl methacrylate, hexyl methacrylate, etc. Copolymers of the above acrylate and/or methacrylate monomers are also useful in the surface treatment of polycarbonates in accordance with the invention.

In the practice of the invention, a discarded silicone-polycarbonate part, which hereinafter means a polycarbonate substrate, for example, a sheet, a head lamp lens, or other molded article which has been treated with a thermoplastic acrylic primer and a silicone hardcoat (SHC), can be contacted with an aqueous alkaline solution having a pH of at least 12, and preferably 12 to 14. The silicone-polycarbonate part can be directly immersed in the aqueous alkaline solution while it is being agitated.

Methods for producing aqueous alkaline solutions having an effective pH range can be achieved by dissolving various alkaline materials in water at concentrations from 5% to 40%, and preferably 20% to 40% by weight of solution, such as hydroxides of alkali metals like, lithium, cesium, rubidium, calcium, sodium, and potassium, and hydroxides of ammonium, or tetraalkylammonium, for example tetramethylammonium and tetrabutylammonium. Temperatures in the range of between at least about 40° C. to 100° C., and preferably a temperature of 45° C. to 80° C. can be used. The polycarbonate article can be exposed to the aqueous alkaline solution for a period of at least 5 min to 60 min, and preferably at least 10 min to 15 min, depending upon such factors as the pH and temperature of the aqueous caustic stripping bath, the thickness of the silicone hardcoat, and the degree and nature of the agitation used. An agitator, such as a stirrer, can be used to effect the selective removal of the silicone hardcoat on the polycarbonate surface.

After recovery of the treated polycarbonate, it can be dried at a temperature in the range of from 50° C. to 124° C.

The polycarbonate article can then be treated with a silicone hardcoat mixture as shown by Clark U.S. Pat. No. 4,027,073 or Anthony U.S. Pat. No. 4,525,426.

In order that those skilled in the art will be better able to practice the present invention, the following examples are given by way of illustration and not by way of limitation. All parts are by weight.

EXAMPLE

Several 4"×6"×⅛" polycarbonate test samples were cut from a silicone-polycarbonate sheet which had been primed with a thermoplastic polymethylmethacrylate followed by the application of a silicone hardcoat. The silicone hardcoat is shown by Anthony U.S. Pat. No. 4,525,426.

The resulting test samples were treated with an aqueous caustic bath having a ratio of 80 grams of sodium hydroxide per 400 ml of water. During treatment, the solution was agitated and maintained at 80° C. plus or minus 1° C.

Throughout the treating procedure, the test samples were examined after 5 minutes, 10 minutes and 15 minutes, and at 10 minute intervals thereafter. It was found that after a 10 minute treatment, the silicone hardcoat was removed based on ATR/IR measurements. Treatment of the test samples was continued for a period of up to 120 minutes to determine if there were any additional changes on the surface of the samples.

The following results were obtained where "Treated"(min) means bath duration:

TABLE 1

| Treated | Coating Removed | |
|---------|-----------------|--------|
| (min)   | Hardcoat        | Primer |
| 0 to 10 | No              | No     |
| 10 to 15| Yes             | No     |
| 15 to 120| Yes            | No     |

It was found that treatment in the stripping bath for a period of from 10 to 15 minutes was sufficient to effect the selective removal of the silicone hardcoat without substantially affecting the thermoplastic primer layer. It was found that after 14 hrs of treatment, the primer layer remained on the substrate surface based on visual observation after selective etching with HF and sulphuric acid, and ATR/IR measurements.

The treated polycarbonate samples having the primer layer intact and free of silicone hardcoat were washed with tap water and blotted dry with paper tissue. The polycarbonate samples were then recoated with silicone hardcoat in accordance with the procedure of Anthony U.S. Pat. No. 4,525,426.

Silicone-polycarbonate samples made by the selective removal of the silicone hardcoat and then restored with reapplication of new silicone hardcoat "treated samples" were compared to similar silicone-polycarbonate samples which had not been subjected to the alkaline bath treatment. The comparison was made with respect to initial adhesion "IA", 65° C. water soak adhesion "WS", UVB accelerated weather "QUVB", and abrasion resistance "Taber 500".

The initial adhesion test was carried out in accordance with ASTM D-3359 as follows:

Adhesive tape, 3M Brand 610 was applied to a scribed area of 100 1×1 mm squares; the tape was then pulled off. Any coating separation was considered a failure.

The water soak test involved immersing ASTM D-3359 scribed samples in a constant temperature deionized water bath (65±1° C.) for 2 weeks. The samples were checked for adhesion loss daily using the ASTM tape pull test; any adhesion loss failed the test.

In the UVB accelerated weathering test, "QUVB", the treated and untreated samples were exposed to UVB light in a Q-Panel accelerated weathering tester equipped with FS-40 UVB fluorescent lamps. The samples were exposed to 8 hours of UV at a black panel temperature of 70° C. followed by 4 hours of dark condensation at 50° C. Failure by delamination of the coating was measured in hours.

Abrasion resistance "Taber 500" was determined in accordance with ASTM D-1044. A Taber Model 5130 abraser was used fitted with Calibrase CS-10F wheels having a 500 g load per wheel. Percent haze was measured with a Gardener XL-835 Colorimeter before and after abrading for 500 cycles.

The following results compare treated and untreated silicone-polycarbonate samples where "treated" means restored in accordance with the invention:

TABLE II

| Treated | Init Ad | Water Soak | QUVB | Δ % Haze Taber 500 |
|---------|---------|------------|----------|---------------------|
| Yes | pass | pass | 3000 hrs | 12.3 ± .8% |
| No | pass | pass | 3600 hrs | 11.1 ± .2% |

The above results show that when the silicone-polycarbonate samples were subjected to an aqueous alkaline bath treatment to effect removal of the silicone hardcoat, the resulting polycarbonate sample could be further treated with additional silicone hardcoat to produce a restored silicone-polycarbonate composite. The restored silicone-polycarbonate composite had properties substantially similar to silicone-polycarbonate composites which had not been subjected to alkaline bath treatment Although the above example is directed to only a few of the very many variables which can be used in the practice of the present invention, it should be understood that the present invention is directed to the use of a much broader variety of materials and conditions as shown by the description preceding this example.

What is claimed is:

1. A process for selectively removing a defective silicone hardcoat layer from a silicone-polycarbonate composite comprising a silicone hardcoat layer, an intermediate thermoplastic acrylic primer layer and a polycarbonate substrate which process comprises the sequential steps of:

(1) effecting contact at a temperature of about 40° C. to about 100° C. between the silicone-polycarbonate composite and an aqueous alkaline bath having a concentration of from 20% to 40% by weight of the bath of an alkali metal hydroxide or a hydroxide of ammonium or tetraalkylammonium to provide a pH in the range of at least 12 and up to about 14 while the bath is agitated for a time sufficient to effect substantially complete removal of the silicone hard coat layer from the silicone-polycarbonate composite without removing the thermoplastic acrylic primer layer, (2) washing and thereafter drying the resulting polycarbonate composite of (1) and (3) applying a silicone hardcoat to the thermoplastic acrylic primary layer to form a silicone-polycarbonate composite.

2. The process in accordance with claim 1, where the silicone-polycarbonate composite is a silicone-bisphenol A polycarbonate composite.

3. The process in accordance with claim 1, where the thermoplastic acrylic primer layer is a polymethylmethacrylate.

4. The process in accordance with claim 1, where the thermoplastic acrylic primer layer is a polyethylmethacrylate.

5. A process in accordance with claim 1, where the silicone-polycarbonate composite is contacted to the aqueous stripping bath for about 10 to about 120 minutes.

6. A process in accordance with claim 1, where the silicone hardcoat mixture in step (3) has a pH in the range of about 3.5 to about 8.

* * * * *

UNITED STATES PATENT AND TRADEMARK OFFICE
CERTIFICATE OF CORRECTION

PATENT NO. : 5,384,159
DATED : January 24, 1995
INVENTOR(S) : Gregory R. Gillette, et al It is certified that error appears in the above-indentified patent and that said Letters Patent is hereby corrected as shown below:

On title page, item [54] and col. 1, line 2, in title, "DISCHARDED" should read —DISCARDED—.

Signed and Sealed this

Twenty-fifth Day of April, 1995

Attest:

BRUCE LEHMAN

*Attesting Officer*   *Commissioner of Patents and Trademarks*